United States Patent
Sone

(10) Patent No.: US 9,224,011 B2
(45) Date of Patent: Dec. 29, 2015

(54) EMBEDDED SYSTEM, INFORMATION PROCESSING UNIT, AND IMAGE FORMING APPARATUS

(71) Applicant: KYOCERA Document Solutions Inc., Osaka (JP)

(72) Inventor: Masaki Sone, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/479,555

(22) Filed: Sep. 8, 2014

(65) Prior Publication Data

US 2015/0074420 A1 Mar. 12, 2015

(30) Foreign Application Priority Data

Sep. 11, 2013 (JP) ................................. 2013-188003

(51) Int. Cl.
*H04L 9/32* (2006.01)
*G06F 21/64* (2013.01)
*G06F 9/445* (2006.01)

(52) U.S. Cl.
CPC ...... *G06F 21/64* (2013.01); *G06F 8/65* (2013.01); *G06F 8/665* (2013.01); *H04L 9/3247* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,318,151 B1 * | 1/2008 | Harris | ................... | G06F 21/572 713/100 |
| 8,560,823 B1 * | 10/2013 | Aytek | ..................... | G06F 8/665 713/191 |
| 8,874,922 B2 * | 10/2014 | Jaber | ...................... | G06F 21/57 713/153 |
| 2012/0117365 A1 * | 5/2012 | Navy | .................... | G06F 21/572 713/2 |
| 2013/0024696 A1 * | 1/2013 | Rudelic | ................. | H04L 9/0891 713/176 |
| 2013/0185548 A1 * | 7/2013 | Djabarov | ............. | H04L 41/082 713/2 |
| 2013/0185564 A1 * | 7/2013 | Jaber | ...................... | G06F 21/57 713/176 |

FOREIGN PATENT DOCUMENTS

| | | |
|---|---|---|
| JP | 2006-185063 A | 7/2006 |
| JP | 2011-150524 A | 8/2011 |

* cited by examiner

*Primary Examiner* — Beemnet Dada

(57) ABSTRACT

An embedded system includes a nonvolatile memory, a control section, and a firmware update section. The nonvolatile memory stores firmware and a public key in a normal area, and stores a hash value concerning the public key in an access restricted area. The control section reads and executes the firmware from the nonvolatile memory. The firmware update section receives new firmware in which the hash value is encrypted and given as an electronic signature, and updates the firmware to the new firmware. The firmware update section is configured to: read the public key from the nonvolatile memory to calculate the hash value concerning the public key; when the hash value is identical to the hash value stored in the nonvolatile memory, calculate a hash value of the new firmware; decrypt the electronic signature with the public key to restore the hash value; and when these hash values are identical to each other, update the firmware.

7 Claims, 5 Drawing Sheets

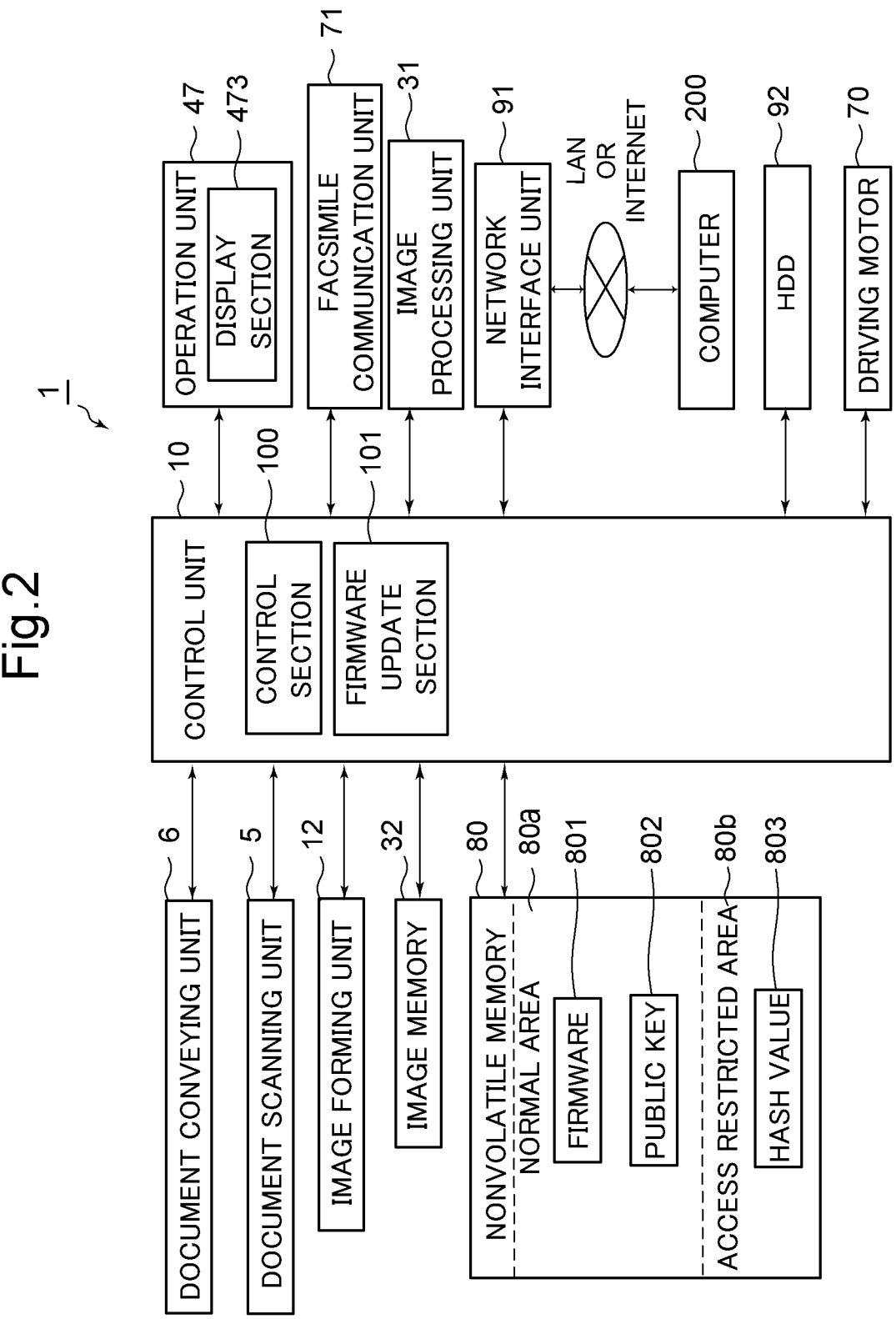

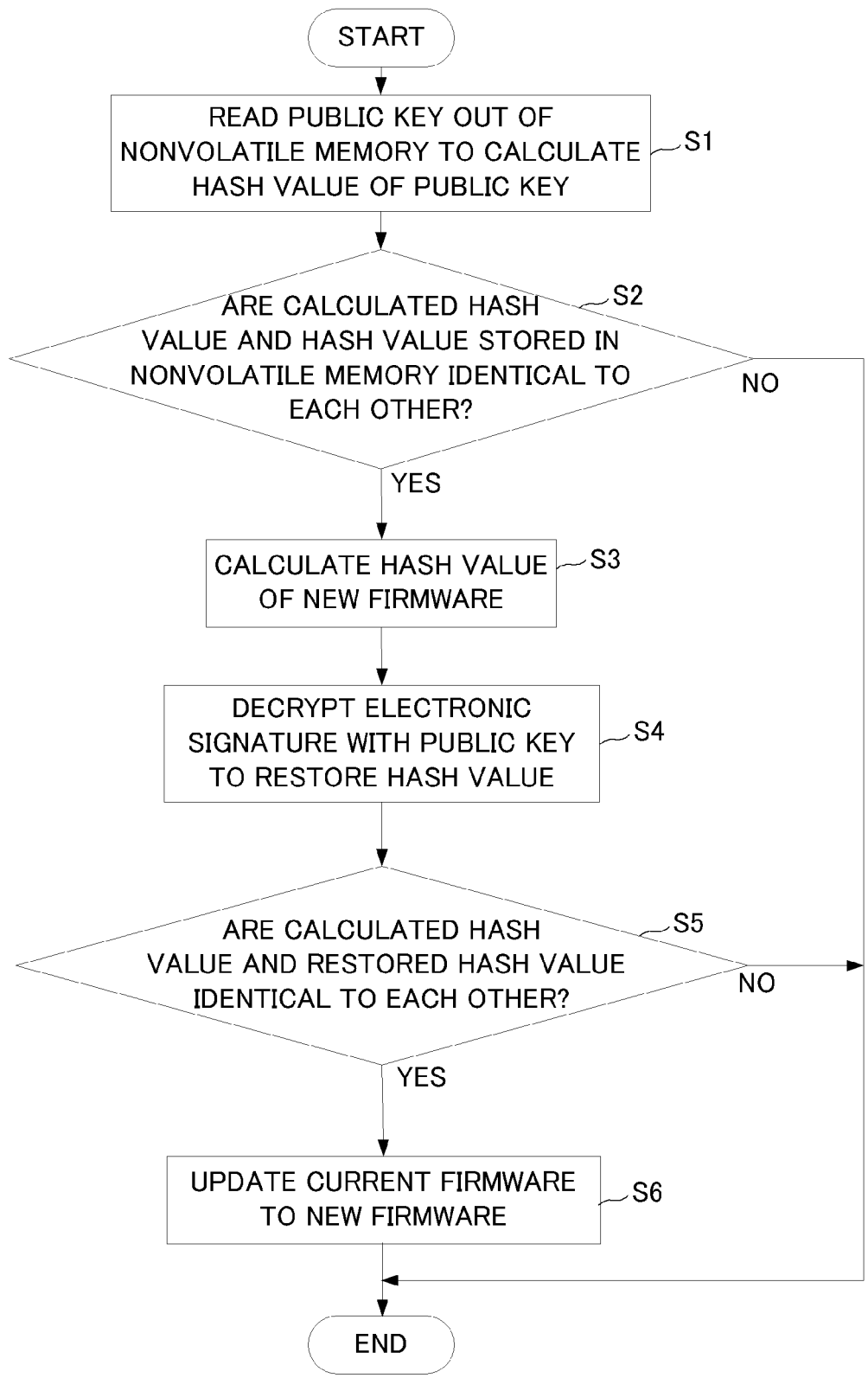

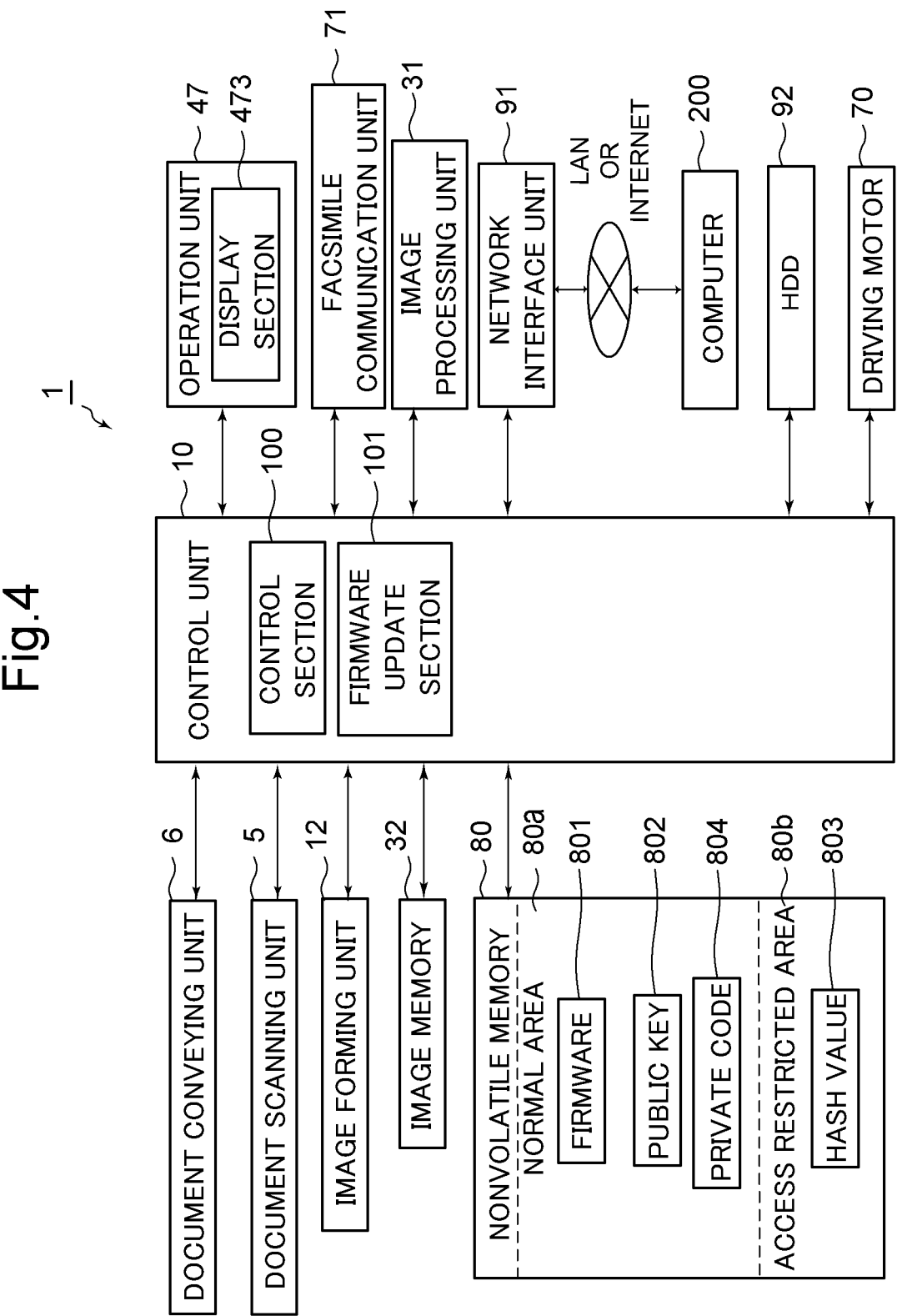

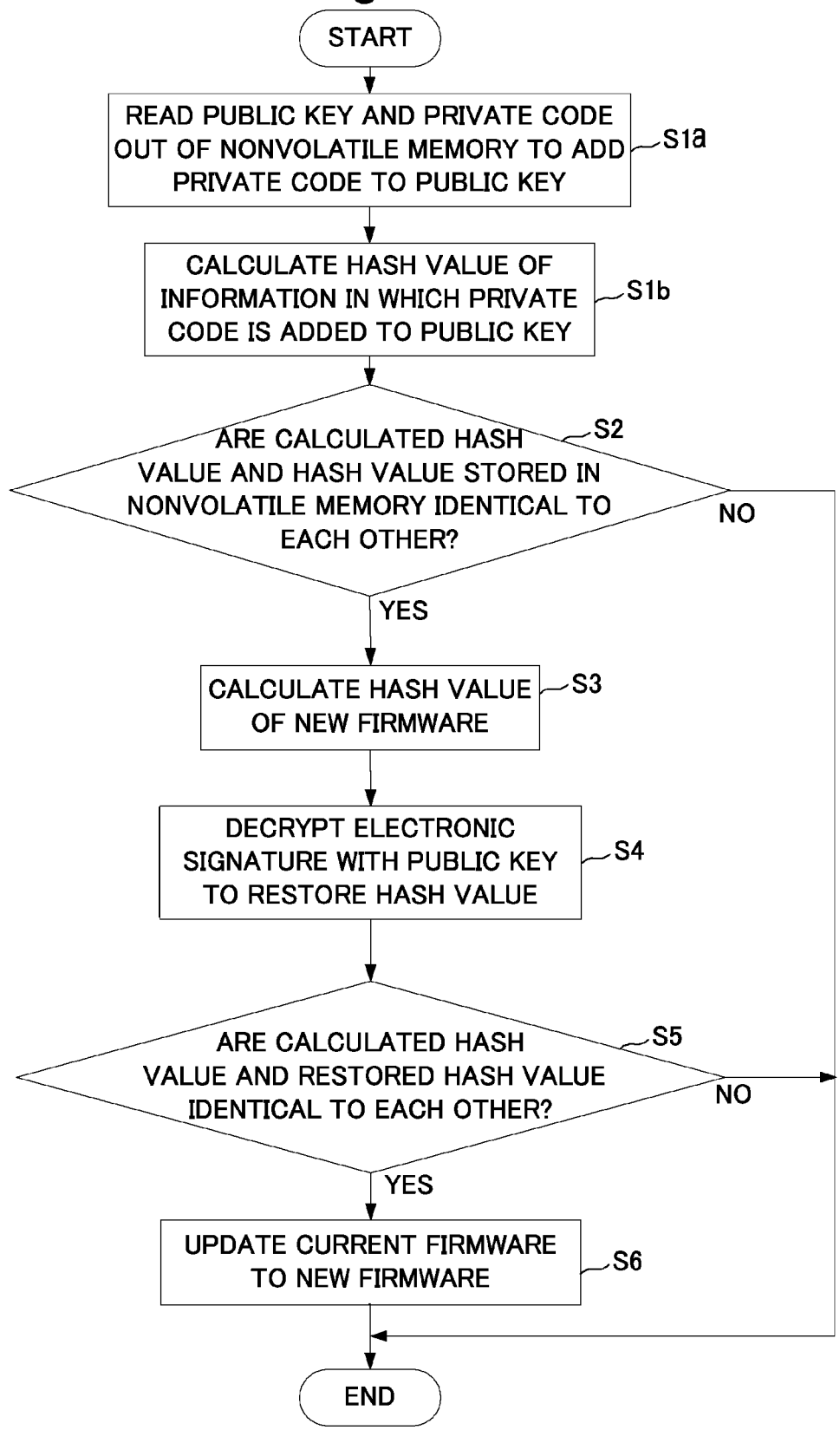

EMBEDDED SYSTEM, INFORMATION PROCESSING UNIT, AND IMAGE FORMING APPARATUS

INCORPORATION BY REFERENCE

This application claims priority to Japanese Patent Application No. 2013-188003 filed on Sep. 11, 2013, the entire contents of which are incorporated herein by reference.

BACKGROUND

This disclosure relates to an embedded system, an information processing unit, and an image forming apparatus, and particularly to a technique for security improvement in firmware updates.

Recently, many multifunction peripherals combining multiple functions such as a copy function, a printer function, a scanner function, and a facsimile function have been introduced into office environments. To implement such various functions, a multifunction peripheral is configured as an embedded system. In other words, the various functions in a multifunction peripheral are described by a computer program, and are stored in a nonvolatile memory as firmware. A central processing unit (CPU) executes the program to control various hardware devices in the multifunction peripheral, thereby providing a desired function.

Firmware may be updated for the purpose of elimination of errors (bugs) discovered ex post facto or improvement and expansion of functions. In this case, if the firmware is updated to be altered illegally, the multifunction peripheral may not operate at all, or confidential information may be stolen from the multifunction peripheral. Thus, when the firmware is updated, the fact that new firmware to be installed is not illegally altered, i.e. genuineness of the new firmware, should be verifiable.

In this respect, for example, there is a technique for preventing the installation of any firmware that may be illegally altered by encrypting a hash value of the new firmware with a private key, giving the encrypted hash value to the new firmware as an electronic signature, and verifying the electronic signature using a public key when the new firmware is installed. Further, there is also proposed a technique for restricting installation or execution of software copied illegally by calculating a hash value of information unique to an executing device and an external memory, giving the hash value to software as an electronic signature, and verifying the electronic signature using a public key when the software is installed or executed.

SUMMARY

As an aspect of this disclosure, a technique further improving the aforementioned technique is proposed.

An embedded system according to an aspect of this disclosure includes a nonvolatile memory, a control section, and a firmware update section.

The nonvolatile memory has a normal area and an access restricted area, stores firmware and a public key in the normal area, and stores a hash value concerning the public key in the access restricted area.

The control section reads and executes the firmware from the nonvolatile memory.

The firmware update section receives new firmware in which the hash value is encrypted and given as an electronic signature, and updates the firmware to the new firmware.

Thus, the firmware update section is configured to: read the public key from the nonvolatile memory to calculate the hash value concerning the public key; when the hash value is identical to the hash value stored in the nonvolatile memory, calculate a hash value of the new firmware; decrypt the electronic signature with the public key to restore the hash value; and when these hash values are identical to each other, update the firmware.

Further, an information processing unit and an image forming apparatus according to another aspect of this disclosure includes the control section and the firmware update section. In detail, the information processing unit and the image forming apparatus are configured to read and execute the firmware from the nonvolatile memory without including the nonvolatile memory as a component.

BRIEF DESCRIPTION OF THE DRAWINGS

FIG. 2 is a functional block diagram schematically illustrating primary internal constitutions of the image forming apparatus according to an example.

FIG. 3 is a flow chart for updating firmware according to an example.

FIG. 4 is a functional block diagram schematically illustrating primary internal constitutions of an image forming apparatus according to another example.

FIG. 5 is a flow chart for updating firmware according to another example.

DETAILED DESCRIPTION

Figure 1:
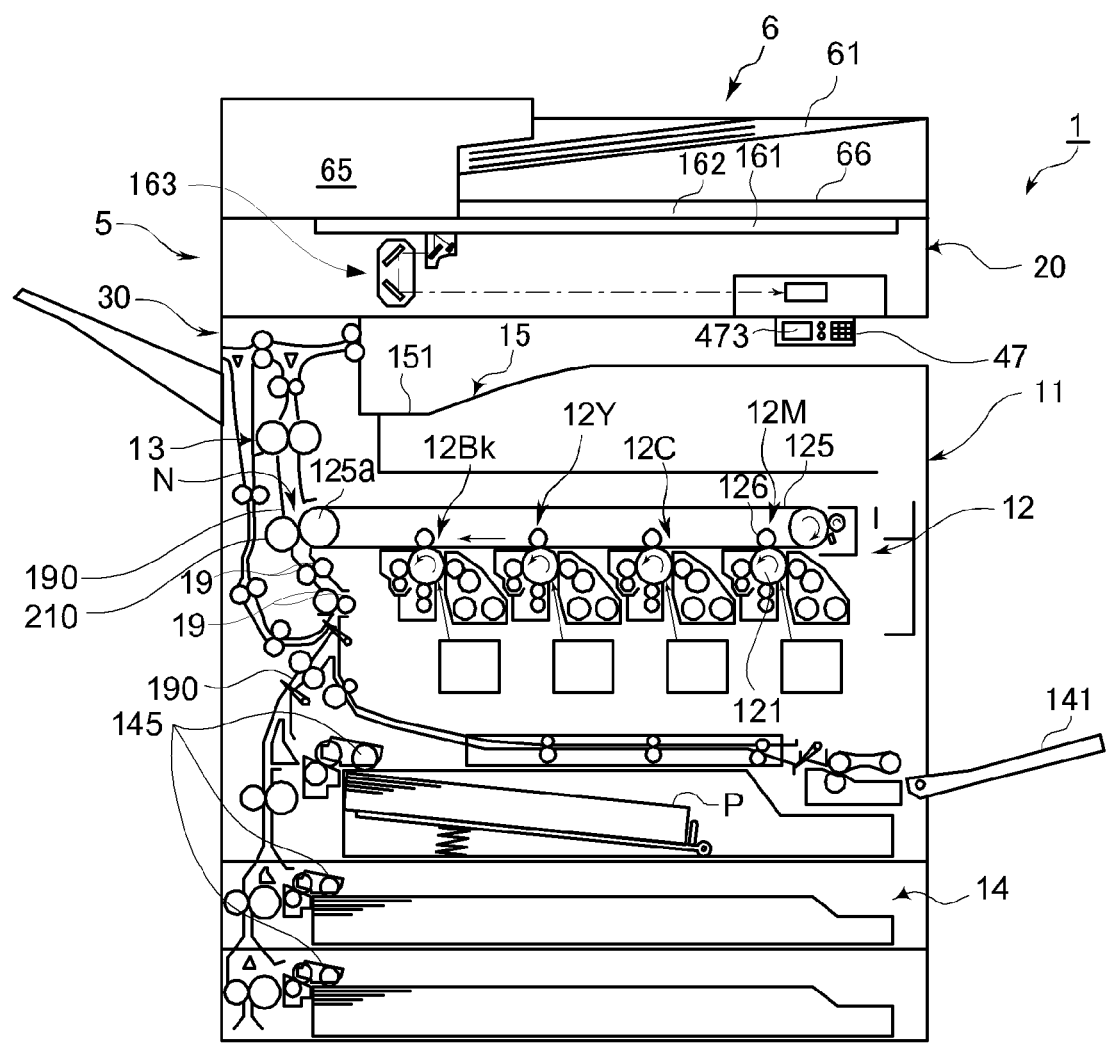
FIG. 1 is a front cross-sectional diagram illustrating a structure of an image forming apparatus according to an embodiment of this disclosure.

Hereinafter, an embedded system, an information processing unit, and an image forming apparatus according to an embodiment will be described as an aspect of this disclosure with reference to the drawings. FIG. 1 is a front cross-sectional diagram illustrating a structure of an image forming apparatus according to an embodiment of this disclosure. The image forming apparatus 1 is, for instance, a multifunction peripheral combining multiple functions such as a copy function, a printer function, a scanner function, and a facsimile function.

The image forming apparatus 1 generally includes an apparatus main body 11, a document scanning device 20 disposed above the apparatus main body 11 so as to be opposite to the apparatus main body 11, and a connecting section 30 interposed between the document scanning device 20 and the apparatus main body 11.

The document scanning device 20 is supported by an upper end of the connecting section 30. The document scanning device 20 includes a document scanning unit 5 and a document conveying unit 6.

The document scanning unit 5 includes a contact glass 161 which is mounted in an upper face opening of a document scanning unit housing in order to load a document. The contact glass 161 is provided with a loaded document scanning section (not shown) scanning the loaded document and a conveyed document scanning section (not shown) scanning a document conveyed by the document conveying unit 6. The document scanning unit 5 further includes an openable document pressing cover 162 pressing the document loaded on the contact glass 161, and a scanning unit 163 scanning respective images of the document loaded on the loaded document scanning section of the contact glass 161 and of the document conveyed to the conveyed document scanning section of the contact glass 161. The scanning unit 163 optically scans the image of the document using an image sensor such as a charge coupled device (CCD) or a complementary metal oxide semiconductor (CMOS), and generates image data.

The document conveying unit 6 includes a document loading table 61 on which the documents are loaded, a document ejecting section 66 to which the documents whose images have been scanned are ejected, and a document conveying mechanism 65. The document conveying mechanism 65 includes a paper feed roller (not shown), a conveying roller, and a paper reversing mechanism. The document conveying mechanism 65 draws the documents loaded on the document loading table 61 one by one by driving the paper feed roller and the conveying roller, conveys the documents to the conveyed document scanning section of the contact glass 161, allows the documents to be scanned by the scanning unit 163, and then ejects the documents to the document ejecting section 66. Further, the document conveying mechanism 65 causes the paper reversing mechanism to reverse two sides of the documents and to re-convey the reversed documents to the conveyed document scanning section of the contact glass 161, thereby allowing images of the two sides of the documents to be scanned by the scanning unit 163.

Further, the document conveying unit 6 is provided to be rotatable relative to the document scanning unit 5 such that a front side thereof can move upward. As the front side of the document conveying unit 6 is caused to move upward to open a top face of the contact glass 161 acting as a document table, a user is able to load the documents to be scanned, for instance a book that is in a two-page spread state, on the top face of the contact glass 161.

An operation unit 47 is disposed in the front of the document scanning device 20. The operation unit 47 receives instructions such as an instruction to perform an image forming operation or an instruction to perform a document scanning operation from an operator with respect to various actions and processes which the image forming apparatus 1 can perform. The operation unit 47 is equipped with a display section 473 displaying operation information to the operator.

The apparatus main body 11 includes an image forming unit 12, a fixing unit 13, a paper feed unit 14, and a paper ejecting unit 15.

When the image forming apparatus 1 performs the document scanning operation, the document scanning unit 5 optically scans the images of the documents conveyed by the document conveying unit 6 or the documents loaded on the contact glass 161, and generates image data. The image data generated by the document scanning unit 5 is stored in an internal HDD or a networked computer.

When the image forming apparatus 1 performs the image forming operation, the image forming unit 12 forms toner images on paper P acting as a recording medium fed from the paper feed unit 14 based on the image data generated by the document scanning operation, the image data received from the networked computer or a user's terminal such as a smartphone, or the image data stored in the internal HDD. Image forming units 12M, 12C, 12Y, and 12Bk of the image forming unit 12 are each equipped with a photosensitive drum, a developing device supplying toner to the photosensitive drum, a toner cartridge containing the toner, a charging device, an exposing device, and a primary transfer roller 126.

When color printing is performed, the image forming unit 12M for magenta, the image forming unit 12C for cyan, the image forming unit 12Y for yellow, and the image forming unit 12Bk for black which constitute the image forming unit 12 cause toner images to be formed on the photosensitive drums 121 by charging, exposing, and developing processes based on images composed of respective color components constituting the image data, and cause the toner images to be transferred to an intermediate transfer belt 125 stretched on a driving roller 125a and a driven roller 125b by primary transfer rollers 126.

The intermediate transfer belt 125 has image carrying surfaces to which the toner images are transferred and which are set for an outer circumferential surface thereof, and is driven in contact with circumferential surfaces of the photosensitive drums 121 by the driving roller 125a. The intermediate transfer belt 125 endlessly travels between the driving roller 125a and the driven roller 125b while being synchronized with each photosensitive drum 121.

The toner images of the respective hues which are transferred onto the intermediate transfer belt 125 are superposed on the intermediate transfer belt 125 by adjusting transfer timing, and become a color toner image. A secondary transfer roller 210 causes the color toner image formed on the surface of the intermediate transfer belt 125 to be transferred to the paper P, which is conveyed from the paper feed unit 14 along a conveying path 190, at a nip zone N across the intermediate transfer belt 125 between the secondary transfer roller 210 and the driving roller 125a. After this, the fixing unit 13 causes the toner image on the paper P to be fixed to the paper P by thermocompression. The paper P on which the color image going through the fixing process is formed is ejected to an ejection tray 151.

The paper feed unit 14 includes multiple paper feed cassettes including a manual tray 141. A control section (not shown) rotatably drives a pickup roller 145 of the paper feed cassette in which paper having a size designated by an instruction from an operator is contained, and conveys the paper P contained in each paper feed cassette toward the nip zone N.

Next, a constitution of the image forming apparatus 1 according to an example will be described. FIG. 2 is a functional block diagram illustrating primary internal constitutions of the image forming apparatus 1 according to an example.

The image forming apparatus 1 includes a control unit 10. The control unit 10 is made up of a central processing unit (CPU), a random access memory (RAM), a read-only memory (ROM), and a dedicated hardware circuit. The control unit 10 undertakes overall operation control of the image forming apparatus 1.

The document scanning unit 5 includes the scanning mechanism 163 having a light irradiator and CCD sensor under the control of the control unit 10. The document scanning unit 5 irradiates the document by means of the light irradiator, and receives reflected light of the document using the CCD sensor, thereby scanning an image from the document.

An image processing unit 31 performs image processing on image data of the image scanned by the document scanning unit 5 as needed. For example, the image processing unit 31 performs predetermined image processing such as shading correction in order to improve a quality after the image scanned by the document scanning unit 5 is formed by the image forming unit 12.

An image memory 32 is a region in which the data of the document image obtained by the scanning of the document scanning unit 5 is temporarily stored or in which the data becoming a print target of the image forming unit 12 is temporarily stored.

The image forming unit 12 performs image formation on the print data scanned by the document scanning unit 5 and the print data received from the networked computer 200.

The operation unit 47 receives instructions from an operator with respect to the various operations and processes which the image forming apparatus 1 can perform. The operation unit 47 includes a touch panel type of display section 473 made of a liquid crystal display instrument.

The display section 473 displays various screens such as an operation screen, a preview screen, and a confirmation screen for a print job state when the image forming apparatus 1 is in a normal operation mode. On the other hand, the display section 473 turns off a light when the image forming apparatus 1 is in a sleep mode.

A facsimile communication unit 71 includes a coder/decoder, a modulator/demodulator, and a network control unit (NCU) that is not illustrated, and performs facsimile transmission using a public telephone network.

A network interface unit 91 is made up of a communication module such as a local area network (LAN) board, and transmits/receives various data to/from the computer 200 within a local area via a LAN connected to the network interface unit 91.

A hard disk drive (HDD) 92 is a large-capacity storage that stores the document image scanned by the document scanning unit 5.

A driving motor 70 is a drive source that provides a rotary drive force to each rotary member of the image forming unit 12 and a pair of conveying rollers 19 and so on A nonvolatile memory 80 is a memory that can continue to hold data even when the image forming apparatus 1 is powered off, for instance a flash memory or an electrically erasable programmable read-only memory (EEPROM).

The nonvolatile memory 80 has a normal area 80a and an access restricted area 80b. The normal area 80a is a storage area in which data can be read and written with no particular restriction. A maintenance person may access the normal area 80a through a dedicated terminal for maintenance. In contrast, the access restricted area 80b is a storage area that is restricted so as to allow access from a system interior only. Thus, it is impossible to read and write data in the access restricted area 80b using the dedicated terminal for maintenance.

The control unit 10 includes a control section 100 and a firmware update section 101.

The control section 100 is connected to the document scanning unit 5, the document conveying unit 6, the image processing unit 31, the image memory 32, the image forming unit 12, the operation unit 47, the facsimile communication unit 71, the nonvolatile memory 80, the network interface unit 91, and the HDD 92. The control section 100 reads out and executes firmware 801 stored in the normal area 80a of the nonvolatile memory 80, thereby controlling driving of each of the units.

The firmware update section 101 installs and updates the firmware 801 executed by the control section 100. The firmware 801 is made by a manufacturer of the image forming apparatus 1, and is provided to the image forming apparatus 1 via a network (not shown) or a Universal Serial Bus (USB) memory (not shown). An electronic signature is given to new firmware to be provided such that genuineness of the new firmware can be verified. The electronic signature is a hash value of the new firmware encrypted with a private key. As a function for the hash value, MD5 or SHA-1 may be used.

A public key 802 that is a partner of the private key is stored in the normal area 80a of the nonvolatile memory 80. Further, a hash value 803 of the public key 802 is stored in the access restricted area 80b of the nonvolatile memory 80. For example, when the image forming apparatus 1 is released, or when a maintenance person installs the image forming apparatus 1, a root certificate is imported to the image forming apparatus 1 using a dedicated maintenance terminal which only the maintenance person can use. Thereby, the firmware update section 101 acquires the public key 802 from the root certificate, and stores the acquired public key in the normal area 80a. Further, the firmware update section 101 calculates the hash value 803 of the public key 802, and stores the calculated hash value 803 in the access restricted area 80b. In this way, the hash value 803 of the public key 802 is stored in the access restricted area 80b that cannot be accessed from the maintenance terminal, and thereby confidentiality of the hash value 803 can be increased.

When the firmware 801 is updated to new firmware, first the firmware update section 101 reads the public key 802 from the nonvolatile memory 80, calculates the hash value of the public key 802, reads the hash value 803 from the nonvolatile memory 80, and compares the read hash value 803 with the hash value obtained by the calculation. When these hash values are identical to each other, the firmware update section 101 calculates a hash value of the provided new firmware, decrypts the electronic signature with the public key 802, restores the hash value, and compares the hash value obtained by the calculation with the restored hash value. When these hash values are identical to each other, the firmware update section 101 writes the provided new firmware in the nonvolatile memory 80, thereby updating the firmware 801.

Next, a firmware updating process performed by the image forming apparatus 1 of FIG. 2 will be described. FIG. 3 is a flow chart for updating firmware according to an example.

The firmware update section 101 reads the public key 802 from the nonvolatile memory 80, and calculates a hash value of the public key 802 (S1). Then, the firmware update section 101 determines whether the hash value calculated in step S1 is identical to the hash value 803 stored in the nonvolatile memory 80 (S2). If these hash values are not identical to each other (NO in step S2), the public key 802 may have been altered, and genuineness of new firmware cannot be verified. As such, the process of updating the firmware is terminated. In contrast, if these hash values are identical to each other (YES in step S2), genuineness of the public key 802 can be verified, and the process proceeds to the next step.

When the genuineness of the public key 802 can be verified in step S2, the firmware update section 101 calculates a hash value of the provided new firmware (S3). Further, the firmware update section 101 decrypts an electronic signature given to the new firmware with the public key 802, and restores the hash value (S4). The order of step S3 and step S4 may be switched. Then, the firmware update section 101 determines whether the hash value calculated in step S3 is identical to the hash value restored in step S4 (S5). If these hash values are not identical to each other (NO in step S5), the new firmware may have been created by an illegal private key, and the genuineness of the new firmware cannot be verified. As such, the process of updating the firmware is terminated. In contrast, if these hash values are identical to each other (YES in step S5), the genuineness of the new firmware can be verified, and thus the firmware update section 101 updates the current firmware 801 to the new firmware (S6), and terminates the process of updating the firmware.

For example, when the electronic signature is made by the illegal private key in a technique using a typical public key encryption technique, verification performed by the public key results in a failure, and the firmware or the electronic signature is altered, in other words, it can be verified that the obtained firmware is not genuine. But if even the public key is also altered, the verification of the electronic signature made by the illegal private key may be successful.

Further, the genuineness of the public key can generally be verified through an external third party organization (certificate authority) using the root certificate. However, an embedded system such as a multifunction peripheral may be used without being connected to an external network such as the Internet, and the genuineness of the public key cannot be verified using the certificate authority.

However, according to the image forming apparatus 1 illustrated in FIG. 2, the genuineness of the public key 802 can be verified by the image forming apparatus 1 in a local environment that is not connected to an external network such as the Internet. Thereby, the genuineness of the new firmware to which the electronic signature is given can be verified, and security in the firmware update can be improved.

Next, a constitution of an image forming apparatus 1 according to another example will be described. FIG. 4 is a functional block diagram illustrating primary internal constitutions of an image forming apparatus 1 according to another example. The same points as the constitution of FIG. 2 will be not described, and only the different points will be described.

In addition to a firmware 801 and a public key 802, a private code 804 is stored in a normal area 80a of a nonvolatile memory 80. The private code 804 is, for instance, information unique to a manufacturer of the image forming apparatus 1. Alternatively, the private code 804 is unique information of the image forming apparatus 1, such as a unique code of an apparatus that is different for each product, a code that is unique to an apparatus and is created based on a serial number of the apparatus, a code uniquely given during factory production, or a code which a maintenance person sets in the event of initial setting.

A hash value 803 stored in the nonvolatile memory 80 is a hash value of information in which the private code 804 is added to the public key 802. For example, when the image forming apparatus 1 is released, or when a maintenance person installs the image forming apparatus 1, a root certificate is imported to the image forming apparatus 1 using a dedicated maintenance terminal which only the maintenance person can use. Thereby, a firmware update section 101 acquires the public key 802 from the root certificate, and stores the acquired public key in the normal area 80a. Further, the firmware update section 101 adds the private code 804 to the public key 802, calculates the hash value 803 of the information in which the private code 804 is added to the public key 802, and stores the calculated hash value 803 in an access restricted area 80b. In this way, the hash value 803 of the public key 802 is stored in the access restricted area 80b that cannot be accessed from the maintenance terminal, and thereby confidentiality of the hash value 803 can be increased.

Next, a firmware updating process performed by the image forming apparatus 1 of FIG. 4 will be described. FIG. 5 is a flow chart for updating firmware according to another example. The same points as the constitution of FIG. 3 will be not described, and only the different points will be described.

The firmware update section 101 reads the public key 802 and the private code 804 from the nonvolatile memory 80, and adds the private code 804 to the public key 802 (S1a). Then, the firmware update section 101 calculates a hash value of information in which the private code 804 is added to the public key 802 (S1b). Afterwards, the firmware update section 101 determines whether the hash value calculated in step S1b is identical to the hash value 803 stored in the nonvolatile memory 80 (S2). The rest is the same as the processes of FIG. 3.

In this way, according to the image forming apparatus 1 of FIG. 4, the private code 804 is added to the public key 802, and genuineness of the public key 802 is verified. Thereby, even when the public key 802 is altered, and further the hash value 803 is rewritten to the hash value of the public key 802, such alteration can be easily detected.

While the embodiments of this disclosure have been described, this disclosure is not limited to the aforementioned embodiments, and may be modified in various ways. For example, in the aforementioned embodiments, the description has been made using the multifunction peripheral as one embodiment of the image forming apparatus according to this disclosure, but this is merely one example. Another electronic apparatus, for example, another image forming apparatus such as a printer, a copier, or a facsimile device, may be used.

Further, in the aforementioned embodiments, the constitutions and the processes illustrated by the aforementioned embodiments using FIGS. 1 to 5 are merely one embodiment of this disclosure, and this disclosure is not intended to be limited to the constitutions and the processes.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An embedded system comprising:
   a nonvolatile memory configured to have a normal area and an access restricted area, to store firmware and a public key in the normal area, and to store a hash value concerning the public key in the access restricted area;
   a control section configured to read and execute the firmware from the nonvolatile memory; and
   a firmware update section configured to receive new firmware in which the hash value is encrypted and given as an electronic signature, and to update the firmware to the new firmware,
   wherein the firmware update section is configured to: read the public key from the nonvolatile memory to calculate the hash value concerning the public key; when the hash value is identical to the hash value stored in the nonvolatile memory, calculate a hash value of the new firmware; decrypt the electronic signature with the public key to restore the hash value; and when these hash values are identical to each other, update the firmware.

2. The embedded system according to claim 1, wherein:
   the nonvolatile memory further stores a private code;
   the hash value stored in the nonvolatile memory is a hash value of information in which the private code is added to the public key; and
   the firmware update section reads the private code from the nonvolatile memory to add the private code to the public key, and calculates the hash value of the information in which the private code is added to the public key.

3. The embedded system according to claim 2, wherein the private code is information unique to a manufacturer of the embedded system.

4. The embedded system according to claim 1, wherein the firmware update section acquires the public key to calculate the hash value of the public key, and stores the public key and the hash value in the nonvolatile memory.

5. The embedded system according to claim 2, wherein the firmware update section acquires the public key to add the private code to the public key, calculates the hash value of the information in which the private code is added to the public key, and stores the public key and the hash value in the nonvolatile memory.

6. An information processing unit comprising:
a control section configured to read and execute firmware from a nonvolatile memory that has a normal area and an access restricted area, stores the firmware and a public key in the normal area, and stores a hash value concerning the public key in the access restricted area; and
a firmware update section configured to receive new firmware in which the hash value is encrypted and given as an electronic signature, and to update the firmware to the new firmware,
wherein the firmware update section is configured to: read the public key from the nonvolatile memory to calculate the hash value concerning the public key; when the hash value is identical to the hash value stored in the nonvolatile memory, calculate a hash value of the new firmware; decrypt the electronic signature with the public key to restore the hash value; and when these hash values are identical to each other, update the firmware.

7. An image forming apparatus comprising:
a control section configured to read and execute firmware from a nonvolatile memory that has a normal area and an access restricted area, stores the firmware and a public key in the normal area, and stores a hash value concerning the public key in the access restricted area; and
a firmware update section configured to receive new firmware in which the hash value is encrypted and given as an electronic signature, and to update the firmware to the new firmware,
wherein the firmware update section is configured to: read the public key from the nonvolatile memory to calculate the hash value concerning the public key; when the hash value is identical to the hash value stored in the nonvolatile memory, calculate a hash value of the new firmware; decrypt the electronic signature with the public key to restore the hash value; and when these hash values are identical to each other, update the firmware.

* * * * *